March 13, 1962
E. CHETAKIAN
3,025,207
METHOD OF CONTINUOUSLY FORMING A REINFORCED PLASTIC
SHEET MATERIAL AND APPARATUS THEREFOR
Filed March 12, 1956
2 Sheets-Sheet 1
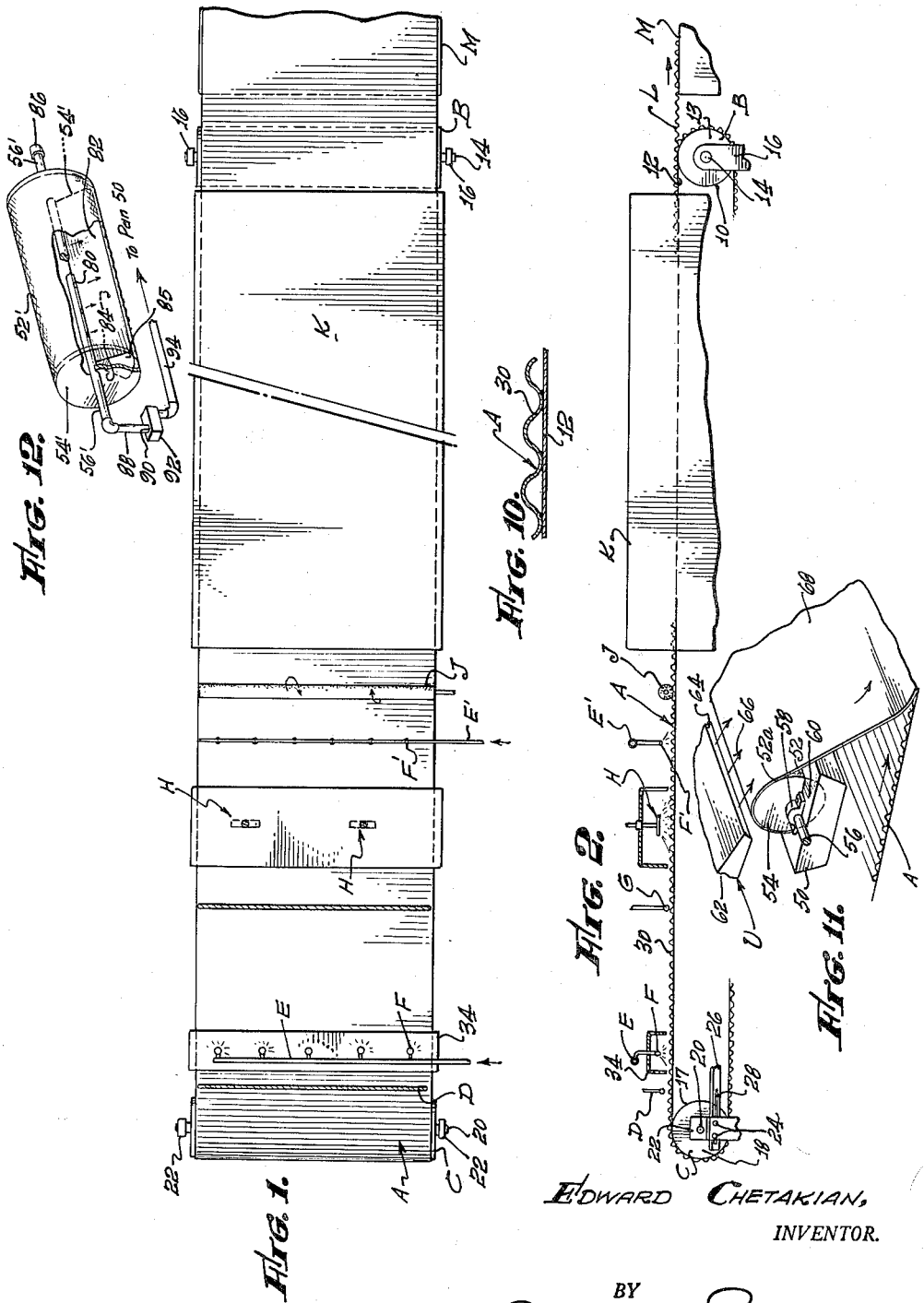
EDWARD CHETAKIAN,
INVENTOR.
BY
William C. Babcock
ATTORNEY.

March 13, 1962 E. CHETAKIAN 3,025,207
METHOD OF CONTINUOUSLY FORMING A REINFORCED PLASTIC
SHEET MATERIAL AND APPARATUS THEREFOR
Filed March 12, 1956 2 Sheets-Sheet 2
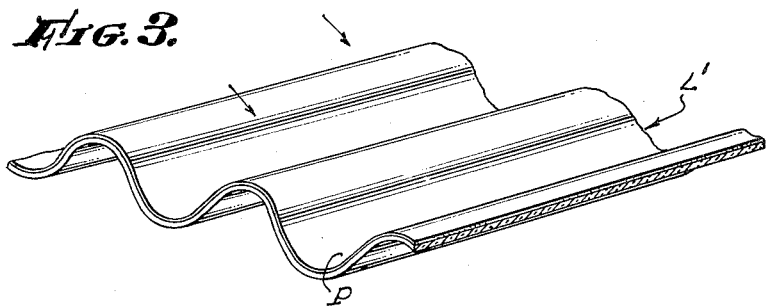
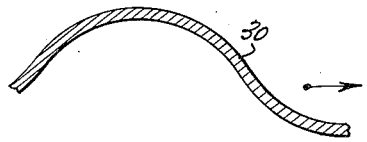
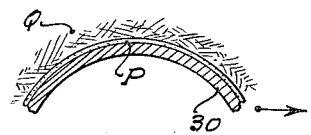
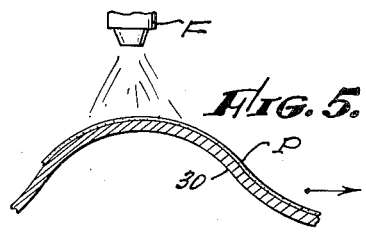
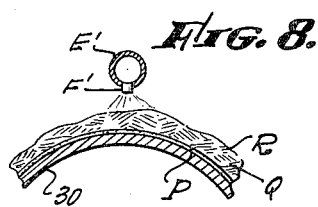
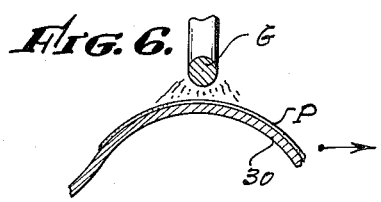
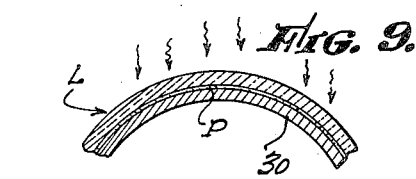
EDWARD CHETAKIAN,
INVENTOR.
BY
William C. Babcock
ATTORNEY.

3,025,207
METHOD OF CONTINUOUSLY FORMING A REINFORCED PLASTIC SHEET MATERIAL AND APPARATUS THEREFOR
Edward Chetakian, Long Beach, Calif.
(1871 West St., Anaheim, Calif.)
Filed Mar. 12, 1956, Ser. No. 571,018
5 Claims. (Cl. 156—246)

The present invention relates generally to the field of synthetic plastic sheets, and more particularly to an apparatus and method for continuously making such sheets in any desired width.

A major object of the present invention is to provide an apparatus and method for the continuous manufacture of sheet plastic material in any desired width, with the sheet material so formed being either flat, corrugated, or any other two dimensionally bended configuration, as desired.

Another object of the invention is to provide an apparatus and method of the character described in which fibre glass, or other reinforcing fibres are disposed within the confines of the plastic material and enveloped thereby.

A further object of the invention is to provide an apparatus and method that will increase the speed at which plastic sheet material can be formed, either with or without reinforcing fibres forming an integral part thereof.

Yet another object of the invention is to produce a sheet plastic material in as long lengths and of as great widths as desired whereby the sheet material may be utilized for roofing and other covering purposes with a minimum of joints.

A still further object of the invention is to supply a sheet plastic material of uniform color and one in which the reinforcing fibres are completely enveloped in the plastic material.

Another object of the present invention is to provide a sheet plastic material that is sufficiently flexible as to be adaptable for storing in rolls after manufacture, and which will not crack, check or discolor when exposed to the weather.

These and other objects and advantages of the invention will become apparent from the following description of a preferred form thereof, and from the drawings illustrating the apparatus and the steps used in carrying out its method of use, as well as the detailed structure of the sheet material in which:

FIGURE 1 is a plan view of the apparatus used in forming the sheet material;

FIGURE 2 is a side elevational view of the device;

FIGURE 3 is a perspective view of a segment of the sheet material of corrugated configuration;

FIGURE 4 is a vertical cross-sectional view of a fragment of the forming belt;

FIGURE 5 is a vertical cross-sectional view of the forming belt showing a resin surface coat being applied thereto;

FIGURE 6 is a vertical cross-sectional view of a portion of the forming belt and resin surface coat passing under the initial heating element;

FIGURE 7 is a vertical cross-sectional view of a portion of the forming belt and resin surface coat after a layer of reinforcing fibres have been deposited on the resin coating;

FIGURE 8 is a vertical cross-sectional view of a portion of the forming belt, resin surface coat, and layer of reinforcing fibres shown receiving a sealing coat to completely envelope the fibres;

FIGURE 9 is a vertical cross-sectional view of a portion of the forming belt and completed sheet material as they pass through the curing oven;

FIGURE 10 is a vertical cross-sectional view of the detailed structure of the forming belt;

FIGURE 11 is a diagrammatic perspective view of an alternate device for applying reinforcing fibres to the resin coating; and FIGURE 12 is a diagrammatic perspective view of a second alternate device for applying reinforcing fibres to the resin coating.

Referring now to the drawings for the general arrangement of the apparatus used in the production of the sheet material of the present invention, particularly FIGURES 1, 2 and 10 thereof, it will be seen that a relatively long horizontally disposed, endless belt A is rotatably supported by two rollers B and C. Belt A may have either a flat, corrugated, ribbed or any other two dimensionally bended exterior surface, depending on the type of sheet material to be produced, and is formed from a resilient metal having good heat retaining qualities, as well as one that is impervious to the action of liquid resins, such as stainless steel. Roller B is driven by power means (not shown) in a clockwise direction to maintain tension on the upper flight of belt A. An elongate electrically energized heating element D is transversely positioned over belt A and located adjacent the roller C. A pipe E provided with spray nozzles F on the under side thereof is also transversely disposed above belt A, and spaced forwardly from heating element D.

In FIGURES 1 and 2 it will be seen that a second electrically heated element G is disposed above belt A and is spaced forwardly from the nozzle-supporting pipe E and parallel thereto. Cut glass fibres of the desired length are discharged onto the upper flight of belt A by transversely situated cutters H located forwardly from heating element G. A transversely disposed pipe E' having downwardly depending nozzles F' is situated forwardly from fibre cutters H, and serves to discharge a liquid polymerizable surface coating onto the deposited fibres to completely envelope same. An elongate power-driven rotatable screen wire brush J extends across the upper flight of belt A, and is spaced forwardly from the glass fibre cutters H, located parallel thereto. Brush J rotates in a clockwise direction, and is so vertically spaced above belt A that trapped air is removed and replaced by laminating resin.

An elongate oven K having limited openings at both ends is located forwardly from brush J, and is so arranged that the belt A extends longitudinally therethrough. Sheet material L formed as a result of using the above-described apparatus is separated from the upper flight of belt A as the belt starts to pass over the roller B, as can best be seen in FIGURE 1. The sheet material L so removed is deposited on a table or conveyor M, after which the material is trimmed and formed into rolls of the desired length for shipment.

In detail, the roller B comprises a hollow, cylindrical drum having a shell 10 that rotatably supports a flat endless portion 12 of the belt A. By means of spokes or circular plates 13, shell 10 is supported from a shaft 14, the end portions of which are disposed in two identical laterally spaced journal blocks 16. Roller C also includes a hollow cylindrical shell 17 that rotatably supports the opposite end portion of belt A. By spokes or circular plates 18, shell 17 is supported from a shaft 20. The end portions of shaft 20 are rotatably supported in two identical journal blocks 22. Each of the journal blocks 22 has several transversely extending bores formed therein through which bolts 24 extend. A horizontal support member 26 is situated adjacent each block 22, which support members have an elongate slot 28 formed therein. Bolts 24 extend through slots 28. The desired tension is maintained on belt A by moving the blocks 22 longitudinally relative to support members 26 and removably locking the blocks to the supports by tightening the bolts 24.

In FIGURE 10 it will be seen that belt A includes an inwardly disposed flat band 12 that comes into rotatable contact with shells 10 and 17 of rollers B and C respectively. This flat band 12, or one identical thereto, is used when it is desired to manufacture flat sheet material L. However, when it is desired to manufacture sheet material L' of the corrugated configuration shown in FIGURE 3, a second band 30 having transverse, longitudinally spaced corrugations formed therein is affixed to the exterior surface of band 12 as by welding, brazing, or the use of other suitable fastening means.

For the sake of clarity in describing the use of the apparatus, it will be assumed that it is desired to continuously manufacture sheet material L'. The two heating elements D and G are electrically energized and serve to heat that portion of endless belt A situated thereunder. Oven K is likewise actuated to heat the belt A to a desired temperature during the time each portion of the belt is within the confines of the oven. A liquid polymerizable material that is preferably transparent, or at least translucent, is continuously discharged onto the upper surface of band 30 as belt A is caused to rotate at a substantially constant predetermined rate. Initial heating of belt A takes place as the belt passes under heating elements D and G.

The liquid polymerizable coating material P is sprayed onto the corrugated band 30, and due to the heating of the band by elements D and G, the material P assumes a tacky consistency and does not tend to run from the sides of the belt. To prevent loss of the coating material P as it is sprayed onto band 30, it is preferable to surround the pipe E and nozzles F with an elongate box 34 that is open at the bottom.

The upper flight of band 30 bearing a first layer of surface coating material P thereon, moves forwardly, and as the band passes under fibre cutters H, cut reinforcing fibres Q are deposited on the upper surface of material P. From experience, it has been found that the cut fibres Q may be formed from glass, asbestos, organic fibres, or the like. Of course, when maximum transparency is desired in the finished sheet material, it is desirable that cut glass fibres be employed for reinforcing purposes.

As the band 30 continues to move forwardly, liquid polymerizable material is sprayed onto the deposited glass fibres to provide a second layer or sealing coat R. The reinforcing fibres Q are then completely enveloped or sandwiched between the surface coat layer P and the sealing coat layer R. Further forward movement of band 30 subjects the sealing coat layer R to the action of brush J or wire mesh (not shown) whereby trapped air is completely removed therefrom.

Polymerization of layer P and layer R occurs during the time they are within the confines of the oven K and subjected to the elevated temperature therein. The rate at which belt A travels through oven K must be at a speed to permit the surface coat resin P and cover coat resin R to become completely polymerized during exposure to the elevated oven temperature. The length of time required for polymerization of layers P and R can, of course, be shortened by variable catalytic combinations. When it is desired to provide the finished sheet material in a particular color, the sealing coat resin R only is colored the desired shade prior to application. The finished polymerized sheet material appears to be colored throughout, as the sheet is either transparent or translucent, and the color of the sealing coat is visible from both sides.

The apparatus above described permits a wide range of color combinations in the finished sheet material. As an example, if the surface coat resin is opaque, it can be made in one color, and if the seal coat is opaque, it can be another color, whereby the finished sheet material has two sides in different colors. Likewise, an ornamental effect can be achieved by using colored reinforcing fibres when the cover coat resin and seal coat resin are both transparent, or at least translucent.

A particularly important feature of plastic sheet material fabricated by the above described process, is that the reinforcing fibres are completely sealed between the surface coat P and sealing coat R. Thus the possibility of water or moisture being drawn into the confines of the sheet material due to capillary attraction around exposed ends of the reinforcing fibres is eliminated. Introduction of water or moisture into the interior of the plastic sheet is highly detrimental, for when the sheet material is exposed to direct sunlight or heat, the moisture or water expands into steam, resulting in cracking, checking or splitting of the sheet material. Once any of these faults develop in a sheet, it disintegrates rapidly as the cracks, checks or splits provide spaces of larger volume in which water or moisture may lodge and subsequently be transformed into steam when the sheet material is heated by sunlight or other means. Cracks, checks or splits also cause rapid disintegration of such sheet material when it is exposed to freezing temperatures for when water or moisture enters such openings, it is then transformed into ice whereby the size of the faults increase in volume. Thus successive thawing and freezing continues to increase the size of the cracks, checks and splits until the sheet material loses strength and becomes porous.

Although reinforcing fibres can be applied to the surface coat resin as described, it has also been found convenient to apply such material by means of the apparatus shown in FIGURE 11. In this alternate form of the invention, the cutters H are replaced by the apparatus U. Apparatus U includes an elongate pan 50 that is disposed above the belt A in substantially the same position as that of the cutters H which it replaces. A cylindrical screen roll 52 is provided, the ends of which are closed by two circular plates 54 having centrally positioned openings formed therein through which a shaft 56 extends. The shaft is rigidly affixed to the plates as by welding, brazing, or other conventional fastening means, and is rotatably supported in two journal blocks 58 that are mounted on suitable supports 60 situated at opposite ends of the roll. A conduit 62 is located above the roll 52, and has an elongate aperture or orifice 64 formed therein through which a stream of heated air can be directed onto the exterior surface of roll 52. A dispersion of glass, asbestos, or organic fibres is suspended in methylene chloride in which a plastic binder is dissolved. This liquid material is placed in pan 50 to a depth that the lower portion of roll 52 dips therein. Shaft 56 and roll 52 attached thereto are driven at a desired constant speed by a suitable prime mover (not shown).

Apparatus U is employed by rotating roll 52 in a clockwise direction, with the screen forming a part thereof picking up a liquid layer of the dispersion which is carried upwardly past a stream of hot air 66 discharged from the orifice 64. This stream of hot air 66 causes the methylene chloride previously mentioned, or other suitable volatile solvent, to evaporate from the dispersion, and leave a third dried film or layer 68 of bonded fibres on the cylinder. This dried film 68 is peeled off of roll 52 at location 52a (FIGURE 11) as the roll rotates, with the peeled-off film 68 then being laid onto the upper surface of the surface coat resin P. The second layer or sealing coat R is then applied to the film 68 as previously described. Subsequent treatment at an elevated temperature converts the first layer P, third layer 68, and second layer R into an integral sheet, in which the reinforcing fibres are completely enveloped.

A second alternate form of device for applying reinforcing fibres to the surface coat resin is shown in FIGURE 12. A cylindrical screen roll 52' is provided that has circular plates 54' closing the ends thereof, which plates by means of bores formed therein are rotatably supported on a stationary tubular shaft 56'. Shaft 56' that is disposed within the confines of roll 52' has a number of longitudinally spaced apertures so formed along the lower portions thereof. A rigid elongate shell 82 is provided that has two identical downwardly and outwardly extending side walls 84 the upper edges of which are rigidly connected to the lower portion of shaft 56' on opposite sides of apertures 80. Two identical triangular end pieces 85 are affixed to the ends of side walls 82.

One end of shaft 56' is closed by a cap 86 or other closing means, and the other end of the shaft is connected by a tube 88 to the suction side 90 of a pump 92 of variable volume discharge. Pump 92, by a tube 94, discharges the dispersion back into pan 50. By controlling the rate of volume discharge of pump 92, the desired rate of flow of the dispersion can be made to pass through the screen roll 52'. The greater the rate of flow of dispersion through the screen roll 52', the more reinforcing fibres will be deposited thereon as a film for subsequent removal, as previously explained in detail.

It will be apparent that the thickness of the film of reinforcing fibres deposited on screen roll 52' can be controlled by either varying the rate of discharge of pump 92 or leaving the rate of discharge of this pump constant and varying the rate of rotation of screen roll 52'.

Although the inventions herein shown and described are fully capable of achieving the objects and providing the advantages hereinbefore mentioned, it is to be understood that they are merely illustrative of the presently preferred embodiments thereof, and that it is not meant to limit the inventions to the details of construction herein shown and described other than as defined in the appended claims.

I claim:
1. A method of continuously forming at atmospheric pressure a reinforced polymerized resin sheet of any desired width and length, comprising the steps of: continuously depositing a first layer of polymerizable liquid resin directly upon a revolving endless belt having an imperforate and non-planar resin-receiving surface, said first layer having upper and lower surfaces; continuously heating said resin while it is exposed to the atmosphere until it assumes a tacky consistency; continuously depositing a plurality of reinforcing fibres upon said resin when it is sufficiently tacky to prevent said fibres from reaching and protruding through said lower surface; continuously depositing a second layer of polymerizable liquid resin upon said reinforcing fibres so as to completely envelope said fibres between said first and second layers; continuously heating said layers and enveloped fibers so as to cause complete polymerization of said layers, thereby forming an integral sheet; and separating said integral sheet from said endless belt.

2. A method of continuously forming a reinforced polymerized resin sheet of any desired width and length, comprising the steps of: continuously depositing a first layer of polymerizable liquid resin directly upon a revolving endless belt having an imperforate and non-planar resin-receiving surface, said first layer having upper and lower surfaces; continuously heating said resin while it is exposed to the atmosphere until it assumes a tacky consistency; continuously depositing a plurality of reinforcing fibres upon said resin when it is sufficiently tacky to prevent said fibres from reaching and protruding through said lower surface, but sufficiently fluid to allow at least some of said fibres to sink into said resin by reason of the force of gravity; continuously depositing a second layer of polymerizable liquid resin upon said reinforcing fibres so as to completely envelope said fibres between said first and second layers, said second layer having an upper surface; applying uniform pressure to said upper surface of said second layer after said second layer has been deposited, to force out air trapped between said first and second layers; continuously heating said layers and enveloped fibres so as to cause complete polymerization of said layers, thereby forming an integral sheet; and separating said integral sheet from said endless belt.

3. Apparatus for continuously forming at atmospheric pressure a reinforced polymerized resin sheet of any desired width and length, comprising: an endless conveyor belt capable of continuously revolving and having an imperforate and non-planar resin-receiving surface; means for continuously depositing a first layer of polymerizable liquid resin directly upon said belt, said first layer having upper and lower surfaces; means for continuously heating said resin while it is exposed to the atmosphere until it assumes a tacky consistency; means for continuously depositing a plurality of reinforcing fibres upon said resin when it is sufficiently tacky to prevent said fibres from reaching and protruding through said lower surface; means for continuously depositing a second layer of polymerizable liquid resin upon said reinforcing fibres so as to completely envelope said fibres between said first and second layers; means for continuously heating said enveloped fibres and layers so as to cause complete polymerization of said layers, thereby forming an integral sheet; and means for separating said integral sheet from said belt.

4. Apparatus for continuously forming a reinforced polymerized resin sheet of any desired width and length, comprising: an endless conveyor belt capable of continuously revolving and having an imperforate and non-planar resin-receiving surface; means for continuously depositing a first layer of polymerizable liquid resin directly upon said belt, said first layer having upper and lower surfaces; means for continuously heating said resin while it is exposed to the atmosphere until it assumes a tacky consistency; means for continuously depositing a plurality of reinforcing fibres upon said resin when it is sufficiently tacky to prevent said fibres from reaching and protruding through said lower surface, but sufficiently fluid to allow at least some of said fibres to sink into said resin by reason of the force of gravity; means for continuously depositing a second layer of polymerizable liquid resin upon said reinforcing fibres so as to completely envelop said fibres between said first and second layers, said second layer having an upper surface; means for continuously applying uniform pressure to said upper surface of said second layer after said second layer has been deposited, to force out air trapped between said first and second layers; means for continuously heating said layers and enveloped fibres so as to cause complete polymerization of said layers, thereby forming an integral sheet; and means for separating said integral sheet from said belt.

5. Apparatus as defined in claim 4 in which said non-planar resin-receiving surface has the shape of transverse corrugations so that said sheet will have corresponding transverse corrugations when separated from said belt.

(References on following page)

References Cited in the file of this patent

UNITED STATES PATENTS

| | | | |
|---|---|---|---|
| 1,677,905 | Salisbury | July 24, | 1928 |
| 2,067,488 | Hough | Jan. 12, | 1937 |
| 2,155,875 | Stemper | Apr. 25, | 1939 |
| 2,271,058 | Binns | Jan. 27, | 1942 |
| 2,343,600 | Weimann | Mar. 7, | 1944 |
| 2,523,410 | Allard | Sept. 26, | 1950 |
| 2,525,864 | Carter | Oct. 17, | 1950 |
| 2,526,945 | Gray | Oct. 24, | 1950 |
| 2,542,819 | Kropa | Feb. 20, | 1951 |
| 2,556,078 | Francis | June 5, | 1951 |
| 2,556,217 | Rivoche et al. | June 12, | 1951 |
| 2,590,768 | Guilleminot et al. | Mar. 25, | 1952 |
| 2,614,955 | Halsall | Oct. 21, | 1952 |
| 2,675,779 | Borushko | Apr. 20, | 1954 |
| 2,695,256 | De Olloqui et al. | Nov. 23, | 1954 |
| 2,710,275 | Waggoner | June 7, | 1955 |
| 2,732,886 | Andreoli et al. | Jan. 31, | 1956 |
| 2,753,766 | Simpson | July 10, | 1956 |
| 2,784,763 | Shorts | Mar. 12, | 1957 |